(12) United States Patent
Balicki et al.

(10) Patent No.: US 12,561,820 B2
(45) Date of Patent: Feb. 24, 2026

(54) IDENTIFYING OUT-OF-PLANE DEVIATION

(71) Applicant: KONINKLIJKE PHILIPS N.V.,
Eindhoven (NL)

(72) Inventors: Marcin Arkadiusz Balicki, Cambridge,
MA (US); Molly Lara Flexman,
Melrose, MA (US)

(73) Assignee: KONINKLIJKE PHILIPS N.V.,
Eindhoven (NL)

( * ) Notice: Subject to any disclaimer, the term of this
patent is extended or adjusted under 35
U.S.C. 154(b) by 398 days.

(21) Appl. No.: 18/026,037

(22) PCT Filed: Sep. 9, 2021

(86) PCT No.: PCT/EP2021/074741
§ 371 (c)(1),
(2) Date: Mar. 13, 2023

(87) PCT Pub. No.: WO2022/063581
PCT Pub. Date: Mar. 31, 2022

(65) Prior Publication Data
US 2023/0368405 A1 Nov. 16, 2023

Related U.S. Application Data

(60) Provisional application No. 63/081,974, filed on Sep.
23, 2020.

(51) Int. Cl.
*G06T 7/55* (2017.01)
*G06T 7/00* (2017.01)

(52) U.S. Cl.
CPC .............. *G06T 7/55* (2017.01); *G06T 7/0012*
(2013.01); *G06T 2207/10116* (2013.01); *G06T*
*2207/30101* (2013.01)

(58) Field of Classification Search
CPC .................... G06T 7/55; G06T 7/0012; G06T
2207/10116; G06T 2207/30101;
(Continued)

(56) References Cited

U.S. PATENT DOCUMENTS

2004/0133129 A1   7/2004  Harari et al.
2014/0058251 A1*  2/2014  Stigall ...................... A61B 6/12
600/407
(Continued)

OTHER PUBLICATIONS

Frimerman et al., "Novel Method for Real Time Co-Registration of
IVUS and Coronary Angiography" Journal of Interventional Car-
diology, vol. 29, Issue 2, pp. 225-231, 2016.
(Continued)

*Primary Examiner* — Matthew C Bella
*Assistant Examiner* — Andrew B. Jones

(57) ABSTRACT

A computer-implemented method of identifying an out-of-
plane deviation of an elongate interventional device (110).
The method includes identifying (SI 30) in the one or more
X-ray images (180), and based on a distance ($190_{1 \ldots n-1}$)
between one or more pairs of the fiducial markers
($160_{1 \ldots n}$) detected in the one or more X-ray images (180),
a position of one or more segments ($170_{1 \ldots n-1}$) of the
elongate interventional device (110) having an out-of-plane
deviation respective the image plane (120).

14 Claims, 11 Drawing Sheets

(58) Field of Classification Search

CPC . G06T 2207/20084; G06T 2207/30021; G06T 7/64; G06T 11/00

See application file for complete search history.

(56)    References Cited

U.S. PATENT DOCUMENTS

2018/0279973  A1     10/2018  Schaefer
2020/0085398  A1*     3/2020  Nempont ................ G06T 7/174
2021/0077047  A1*     3/2021  Tolkowsky ............ A61B 34/30

OTHER PUBLICATIONS

Ruijters et al., "Multi-modal image fusion during minimally invasive treatment", Feb. 15, 2010, University of Eindhoven, ISBN: 978-94-6018-174-0, pp. 1-205.

Arbab-Zadeh et al., "Axial movement of the intravascular ultrasound probe during the cardiac cycle: Implications for three-dimensional reconstruction and measurements of coronary dimensions", American Heart Journal, vol. 138, Iss. 5, Nov. 1999, pp. 865-872.

Trivisonne et al., "Constrained Stochastic State Estimation for 3D Shape Reconstruction of Catheters and Guidewires in Fluoroscopic Images", Apr. 9, 2019, ffhal-02072386v2.

Ronneberger et al., "U-Net: Convolutional Networks for Biomedical Image Segmentation", Computer Science Department and BIOSS Centre for Biological Signaling Studies, University of Freiburg, Germany, pp. 234-241, Nov. 18, 2015.

Ambrosini et al., "Fully automatic and real-time catheter segmentation in X-ray fluoroscopy." International Conference on Medical Image Computing and Computer-Assisted Intervention. Springer, Cham, 2017., pp. 577-585.

Sutskever et al.,"Sequence to sequence learning with neural networks." Advances in neural information processing systems. 2014, pp. 1-9.

Nguyen et al., "End-to-End Real-time Catheter Segmentation with Optical Flow-Guided Warping during Endovascular Intervention." arXiv preprint arXiv:2006.09117, Jun. 16, 2020.

International Search report and Written Opinion of PCT/EP2021/074741 dated Mar. 4, 2022.

* cited by examiner

IDENTIFYING OUT-OF-PLANE DEVIATION

CROSS-REFERENCE TO PRIOR APPLICATIONS

This application is the U.S. National Phase application under 35 U.S.C. § 371 of International Application No. PCT/EP2021/074741, filed on Sep. 9, 2021, which claims the benefit of U.S. Provisional Patent Application Ser. No. 63/081,974, filed on Sep. 23, 2020. These applications are hereby incorporated by reference herein.

TECHNICAL FIELD

The present disclosure relates to identifying an out-of-plane deviation of an elongate interventional device respective an X-ray image plane. A computer-implemented method, a computer program product, a system and an elongate interventional device are also disclosed.

BACKGROUND

X-ray imaging is used by clinicians to image the anatomy in numerous medical investigations. Interventional procedures such as catheterization are for example often performed using X-ray imaging.

In X-ray imaging, the orientation of a source-detector arrangement is adjusted in order to provide a desired view of the anatomy. Live X-ray images or individual X-ray images of the anatomy are generated with the source-detector arrangement in a fixed position respective the anatomy. The X-ray source-detector arrangement includes an X-ray source and an X-ray detector mounted to a support structure. The X-ray source-detector arrangement can typically be rotated around two or more orthogonal axes in order to provide the desired view. Support structures having various shapes have been used, including for example a C-arm, an O-arm, and a U-shaped arm.

X-ray imaging may also be performed in combination with other imaging modalities in order to gain further information about the anatomy. For example, the diagnosis and treatment of peripheral vascular disease typically involves a combination of both X-ray and intravascular ultrasound "IVUS" imaging.

In contrast to the three-dimensional images that are generated from computed tomography "CT" X-ray imaging, X-ray imaging provides projection images. Projection images that are generated by X-ray imaging suffer from a poor representation of depth information. The interpretation of such X-ray images may therefore be challenging.

Thus, there remains room to improve the representation of features in X-ray projection images.

SUMMARY

According to a first aspect of the present disclosure, a computer-implemented method of identifying an out-of-plane deviation of an elongate interventional device respective an image plane defined by X-ray images generated by an X-ray source-detector arrangement, is provided. The elongate interventional device includes a plurality of fiducial markers distributed along a length of the elongate interventional device to define segments of the elongate interventional device, and the method includes:

receiving X-ray imaging data representing one or more X-ray images of the elongate interventional device including the plurality of fiducial markers;

generating one or more X-ray images from the X-ray imaging data; and identifying in the one or more X-ray images, and based on a distance between one or more pairs of the fiducial markers detected in the one or more X-ray images, a position of one or more segments of the elongate interventional device having an out-of-plane deviation respective the image plane.

According to a second aspect of the present disclosure, the X-ray imaging data is generated with the X-ray source-detector arrangement having an initial imaging pose respective the elongate interventional device, and the computer-implemented method includes:

computing a subsequent imaging pose for the X-ray source-detector arrangement respective the elongate interventional device such that the distance between the one or more pairs of the fiducial markers increases for the one or more segments of the elongate interventional device having an out-of-plane deviation.

According to a third aspect of the present disclosure, the computer-implemented method includes:

receiving subsequent X-ray imaging data representing one or more subsequent X-ray images of the elongate interventional device including the plurality of fiducial markers with the X-ray source-detector arrangement having the subsequent imaging pose respective the elongate interventional device; and computing, based on the X-ray imaging data and the subsequent X-ray imaging data, an estimation of the three-dimensional shape of the elongate interventional device.

According to a fourth aspect of the present disclosure, the one or more X-ray images includes a stream of X-ray image frames, and the identifying in the one or more X-ray images a position of one or more segments of the elongate interventional device having an out-of-plane deviation respective the image plane, is based on a change in distance between the one or more pairs of the fiducial markers between consecutive image frames as the elongate interventional device is moved axially along a body lumen.

A computer program product, a system, and an interventional device for use with the system, are also provided in accordance with other aspects of the disclosure.

It is noted that features disclosed in relation to the computer implemented method may also be incorporated into the system, and into the computer program product, in a corresponding manner. For the sake of brevity, features of the computer implemented method are therefore not necessarily duplicated for the system and the computer program product.

Further features and advantages of the present disclosure will become apparent from the following description of examples, which is made with reference to the accompanying drawings.

DETAILED DESCRIPTION

Figures 1, 2, 3:
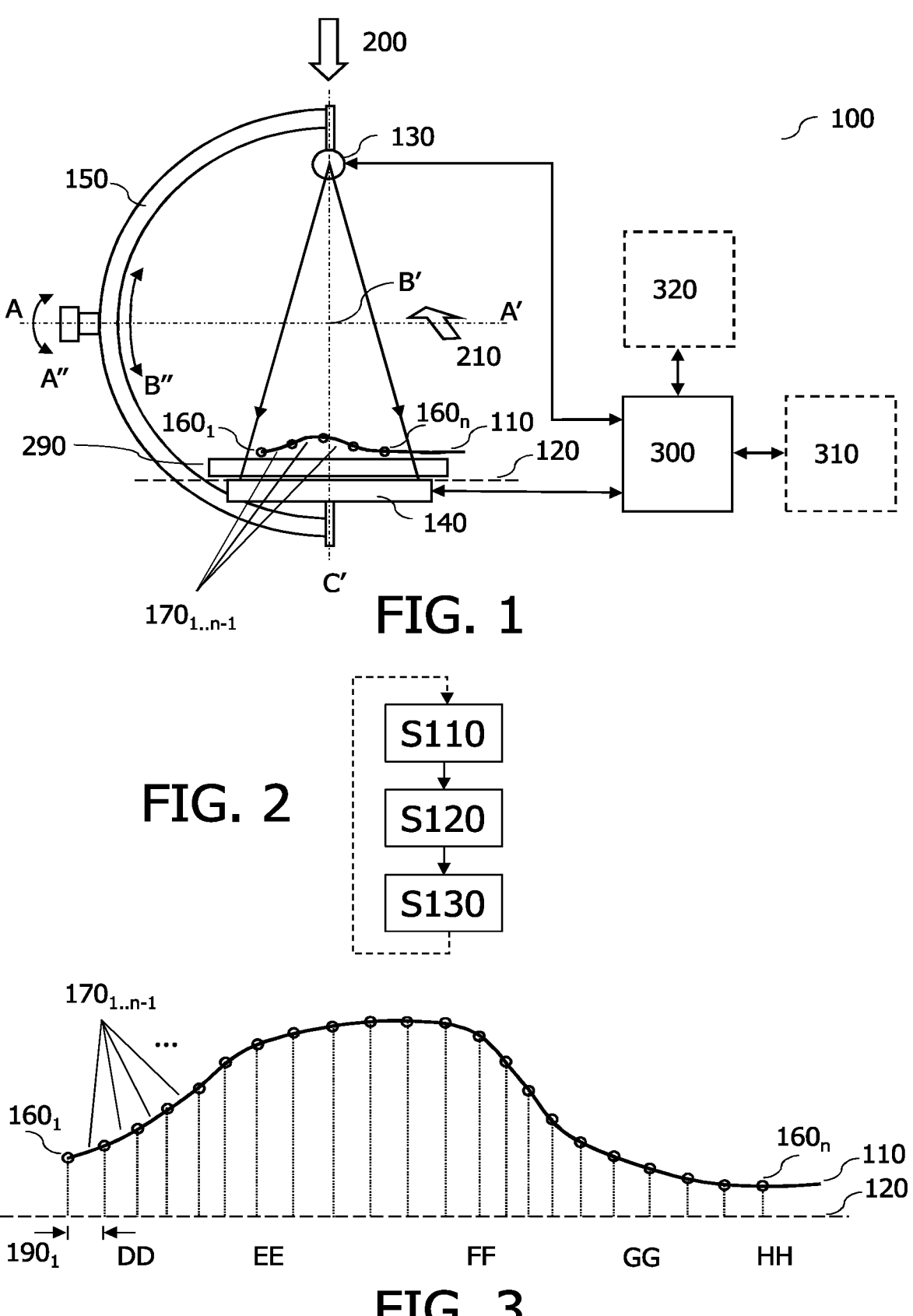
FIG. 1 is a schematic diagram of an example system 100 including an X-ray source-detector arrangement 130, 140, 150 in accordance with some aspects of the disclosure.
FIG. 2 is a flowchart of an example method of identifying an out-of-plane deviation of an elongate interventional device 110 in accordance with some aspects of the disclosure.
FIG. 3 is a schematic diagram of an example elongate interventional device 110 including fiducial markers $160_{1 \ldots n}$ that define segments $170_{1 \ldots n-1}$ of the elongate interventional device 110.

Examples of the present application are provided with reference to the following description and the Figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example and that all features are not necessarily duplicated for the sake of brevity. For instance, features described in relation to a computer-implemented method may be implemented in a system, and in a device, in a corresponding manner.

In the following description, reference is made to computer implemented methods that involve imaging an elongate interventional device within the vasculature. Reference is made to an IVUS imaging procedure wherein an elongate interventional device in the form of an IVUS imaging catheter is disposed within a body lumen in the form of a blood vessel within the vasculature. It is however to be appreciated that examples of the computer implemented methods may be used in other imaging procedures, and with other elongate interventional devices. Examples in accordance with the present disclosure may for instance be used in endoscopy, colonoscopy, bronchoscopy, ventriculoperitoneal shunt placement, and transesophageal echocardiogram "TEE" procedures. Thus, it is contemplated that the methods disclosed herein may be used with other elongate interventional devices than an IVUS imaging catheter, such as, and without limitation: a catheter, a guidewire, an Optical Coherence Tomography "OCT" device, a blood pressure device and/or flow sensor device, a TEE probe, and so forth. It is to be appreciated that the elongate interventional device may, as appropriate, be disposed in other regions of the body than the vasculature, such as for example a body lumen within the digestive tract, the colon, the esophagus and so forth. It is also to be appreciated that instead of, or in addition to an ultrasound sensor, the interventional device may include one or more other sensors, such as, and without limitation: a force sensor, an electrical conductance sensor, an electrical impedance sensor, an electrocardiogram sensor, a chemical sensor, and an optical sensor.

It is noted that the computer-implemented methods disclosed herein may be provided as a non-transitory computer-readable storage medium including computer-readable instructions stored thereon which, when executed by at least one processor, cause the at least one processor to perform the method. In other words, the computer-implemented methods may be implemented as a computer program product. The computer program product can be provided by dedicated hardware or hardware capable of running the software in association with appropriate software. When provided by a processor, these functions can be provided by a single dedicated processor, a single shared processor, or multiple individual processors that some of the processors can share. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non volatile storage device, and the like. Furthermore, examples of the present disclosure can take the form of a computer program product accessible from a computer usable storage medium or a computer-readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or device or propagation medium. Examples of computer-readable media include semiconductor or solid state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

FIG. 1 is a schematic diagram of an example system 100 including an X-ray source-detector arrangement 130, 140, 150 in accordance with some aspects of the disclosure. The X-ray source-detector arrangement in FIG. 1 includes an X-ray source 130, an X-ray detector 140, and a support structure 150. The X-ray source 130 and the X-ray detector 140 are mounted to the support structure 150. In some examples the X-ray source includes a collimator (not illustrated). The X-ray detector includes a two-dimensional array of detector elements and may for example be a planar detector or a curved detector.

A support structure 150 in the form of a so-called C-arm is illustrated in FIG. 1. A C-arm is a C-shaped example of a support structure for supporting the X-ray source 130 and the X-ray detector 140. A support structure 150 with a different shape might alternatively be used in place of the illustrated C-arm, such as an O-shaped arm "O-arm", or a U-shaped arm "U-arm". The support structure 150 may be movable such that it can rotate the X-ray source 130 and the X-ray detector 140 around two or more orthogonal axes. For example, the support structure 150 may rotate the X-ray source 130 and the X-ray detector 140 around the axis A-A', and around the axis B' as indicated by the corresponding arrows A" and B" in FIG. 1. The axis B' is directed perpendicularly into the plane of the drawing. In some examples, the support structure 150 might also rotate the X-ray source 130 and the X-ray detector 140 around a third axis, C-C' in FIG. 1, although this is not essential. The axes A-A', B', and C-C' are illustrated as intersecting in FIG. 1, although this is also not essential and in some examples the axes do not intersect. The support structure 150 may be provided with various bearings and/or movable joints and/or hinges and/or other movable couplings in order to provide the aforementioned movements.

As illustrated in FIG. 1, the X-ray source 110 and the X-ray detector 120 are separated so as to provide an imaging region therebetween. X-rays emitted by the X-ray source 130 are detected by the X-ray detector 140, the extent of which is indicated by the unidirectional arrows in FIG. 1. The X-ray detector 130 receives the X-rays that have traversed the imaging region, and measures their intensity. Any X-ray attenuating media within the imaging region will affect the measured intensity.

An elongate interventional device 110 in the form of an IVUS imaging catheter is disposed in the imaging region between the X-ray source 130 and the X-ray detector 140. The elongate interventional device 110 includes fiducial markers $160_{1 \ldots n}$. The fiducial markers include an X-ray absorbing material such as gold, platinum, tungsten, titanium, barium, bismuth, iridium and tantalum. The fiducial markers $160_{1 \ldots n}$ are distributed along a length of the elongate interventional device 110 to define segments $170_{1 \ldots n-1}$ of the elongate interventional device. The fiducial markers may be in the shape of balls, cylinders, coils of wire, and so forth. The fiducial markers $160_{1 \ldots n}$ result in identifiable regions within the X-ray images represented by the X-ray imaging data. Thus, the X-ray detector 130 of the X-ray source-detector arrangement 130, 140, 150 in FIG. 1 generates X-ray imaging data representing one or more X-ray images of the elongate interventional device 110 including the plurality of fiducial markers $160_{1 \ldots n}$.

The X-ray images generated by the X-ray source-detector arrangement 130, 140, 150 in FIG. 1 define an image plane 120. The X-ray detector illustrated in FIG. 1 represents a planar array of detector elements. In the illustrated example, the image plane 120 is parallel to and coincident with the radiation-receiving face of the planar array of detector elements. The X-ray detector 140 may alternatively include an array of detector elements disposed on a curved surface, or an array of detector elements disposed on planar segments around a curved surface. The curved surface may represent a portion of a cylindrical surface. An image plane may also be defined by such a curved array of detector elements as a plane intercepting the four outermost detector elements in the array.

The system 100 in FIG. 1 also includes one or more processors 300. The system 100 may also include one or more non-transitory computer-readable storage media 310, a display 320, and a user input device such as a keyboard and/or mouse (not illustrated in FIG. 1). The various items in FIG. 1 are in communication with one another as indicated by the interconnecting arrows. Thus, the one or more processors 300 are in communication with the X-ray source 130 and the X-ray detector 140. The one or more non-transitory computer-readable storage media 310 may collectively store instructions that, when executed by the one or more processors 300 cause the system 100 to perform various operations that are described in more detail below. In some examples the user input device may be used to provide user input to the system 100 in the form of instructions for executing the operations. The display 320 may be used to display one or more X-ray images, to display one or more graphical representations associated therewith, to display the user input, and so forth.

In use, the X-ray source-detector arrangement 130, 140, 150 is adjusted to provide a desired view of the imaging region in order to carry out an imaging procedure. In this position, the X-ray source-detector arrangement 130, 140, 150 has an initial pose 200 respective the elongate interventional device 110. The X-ray source 130 is controlled by the one or more processors 300 to generate X-rays. The X-ray detector 140 generates X-ray imaging data representing one or more X-ray images of the elongate interventional device 110 including the plurality of fiducial markers $160_{1 \ldots n}$. The X-ray imaging data may represent a single projection X-ray image, multiple projection X-ray images, or live projection X-ray images. The X-ray imaging data is received by the one or more processors 300. The one or more processors 300 may then perform further operations on the X-ray imaging data, including one or more of: generating one or more X-ray images from the X-ray imaging data for display on display 320, further processing the X-ray image(s) and/or X-ray imaging data, and storing the X-ray image(s) and/or X-ray imaging data using the one or more non-transitory computer-readable storage media 310.

FIG. 2 is a flowchart of an example method of identifying an out-of-plane deviation of an elongate interventional device 110 in accordance with some aspects of the disclosure. The method illustrated in FIG. 2 may be carried-out by the processor 300 of the system illustrated in FIG. 1. With reference to FIG. 2, the computer-implemented method of identifying an out-of-plane deviation of an elongate interventional device 110 respective an image plane 120 defined by X-ray images 180, 220 generated by an X-ray source-detector arrangement 130, 140, 150, the elongate interventional device 110 comprising a plurality of fiducial markers $160_{1 \ldots n}$ distributed along a length of the elongate interventional device 110 to define segments $170_{1 \ldots n-1}$ of the elongate interventional device, comprises:

receiving S110 X-ray imaging data representing one or more X-ray images 180 of the elongate interventional device 110 including the plurality of fiducial markers $160_{1 \ldots n}$;

generating S120 one or more X-ray images 180 from the X-ray imaging data; and identifying S130 in the one or more X-ray images 180, and based on a distance $190_{1 \ldots n-1}$ between one or more pairs of the fiducial markers $160_{1 \ldots n}$ detected in the one or more X-ray images 180, a position of one or more segments $170_{1 \ldots n-1}$ of the elongate interventional device 110 having an out-of-plane deviation respective the image plane 120.

As indicated by way of the dashed line in FIG. 2, the above operations may then be repeated for subsequently-received X-ray images.

By identifying a position of one or more segments $170_{1 \ldots n-1}$ of the elongate interventional device 110 having an out-of-plane deviation respective the image plane 120, the method provides improved visualization of a path of the elongate interventional device when the path deviates towards or away from the image plane 120.

In this example method, the one or more X-ray images may be generated from the X-ray imaging data using image rendering techniques. In the identifying step, the positions of the fiducial markers $160_{1 \ldots n}$ may be detected using image segmentation techniques in order to determine the distance $190_{1 \ldots n-1}$ between one or more pairs of the fiducial markers $160_{1 \ldots n}$ detected in the one or more X-ray images 180. The pairs of fiducial markers $160_{1 \ldots n}$ may be adjacent pairs, or non-adjacent pairs. A position of one or more segments $170_{1 \ldots n-1}$ of the elongate interventional device 110 having an out-of-plane deviation respective the image plane 120 may then be determined by comparing the distance $190_{1 \ldots n-1}$ between one or more pairs of the fiducial markers $160_{1 \ldots n}$. For example, the distance between a pair or fiducial markers $160_{1 \ldots n}$ may be compared to an expected distance, or the distance between one pair of fiducial markers $160_{1 \ldots n}$ in the X-ray image may be compared to the distance between another pair of fiducial markers $160_{1 \ldots n}$ in the X-ray image, or the distance between a pair of fiducial markers $160_{1 \ldots n}$ in the X-ray image may be compared with the distance between the same pair of fiducial markers $160_{1 \ldots n}$ in a subsequent X-ray image. The comparison may for example include determining a difference, or a ratio between the compared values.

The principles of the identifying S130 operation, are illustrated with reference to FIG. 3, which is a schematic diagram of an example elongate interventional device 110 including fiducial markers $160_{1 \ldots n}$ that define segments $170_{1 \ldots n-1}$ of the elongate interventional device 110. In FIG. 3, the elongate interventional device 110 has an n-shaped profile in a plane perpendicular to the image plane 120. The positions of the fiducial markers $160_{1 \ldots n}$ are projected onto the image plane 120. In region DD-EE, the segments $170_{1 \ldots n-1}$ of the elongate interventional device 110 deviate away from the image plane 120. In region EE-FF, the segments $170_{1 \ldots n-1}$ of the elongate interventional device 110 are reasonably parallel to the image plane 120. In region FF-GG, the segments $170_{1 \ldots n-1}$ of the elongate interventional device 110 deviate towards to the image plane 120. In region GG-HH, the segments $170_{1 \ldots n-1}$ of the elongate interventional device 110 are again reasonably parallel to the image plane 120. As can be seen in FIG. 3, in regions DD-EE and FF-GG wherein the segments $170_{1 \ldots n-1}$ of the elongate interventional device 110 deviate towards or away from the image plane 120, the distance $190_{1 \ldots n-1}$ between the pairs of the fiducial markers $160_{1 \ldots n}$ detected in the X-ray image will decrease as compared to regions EE-FF and GG-HH wherein the segments $170_{1 \ldots n-1}$ of the elongate interventional device 110 are reasonably parallel to the image plane 120. It is noted that foreshortening has a comparatively minor effect on changes to the distance $190_{1 \ldots n-1}$, between the fiducial markers $160_{1 \ldots n}$. Consequently, a deviation of the segments $170_{1 \ldots n-1}$ towards the image plane 120, and a deviation of the segments $170_{1 \ldots n-1}$ away from the image plane 120, both result in a decrease in the distance $190_{1 \ldots n-1}$ between the pairs of the fiducial markers $160_{1 \ldots n}$ detected in the X-ray image.

Figure 4:
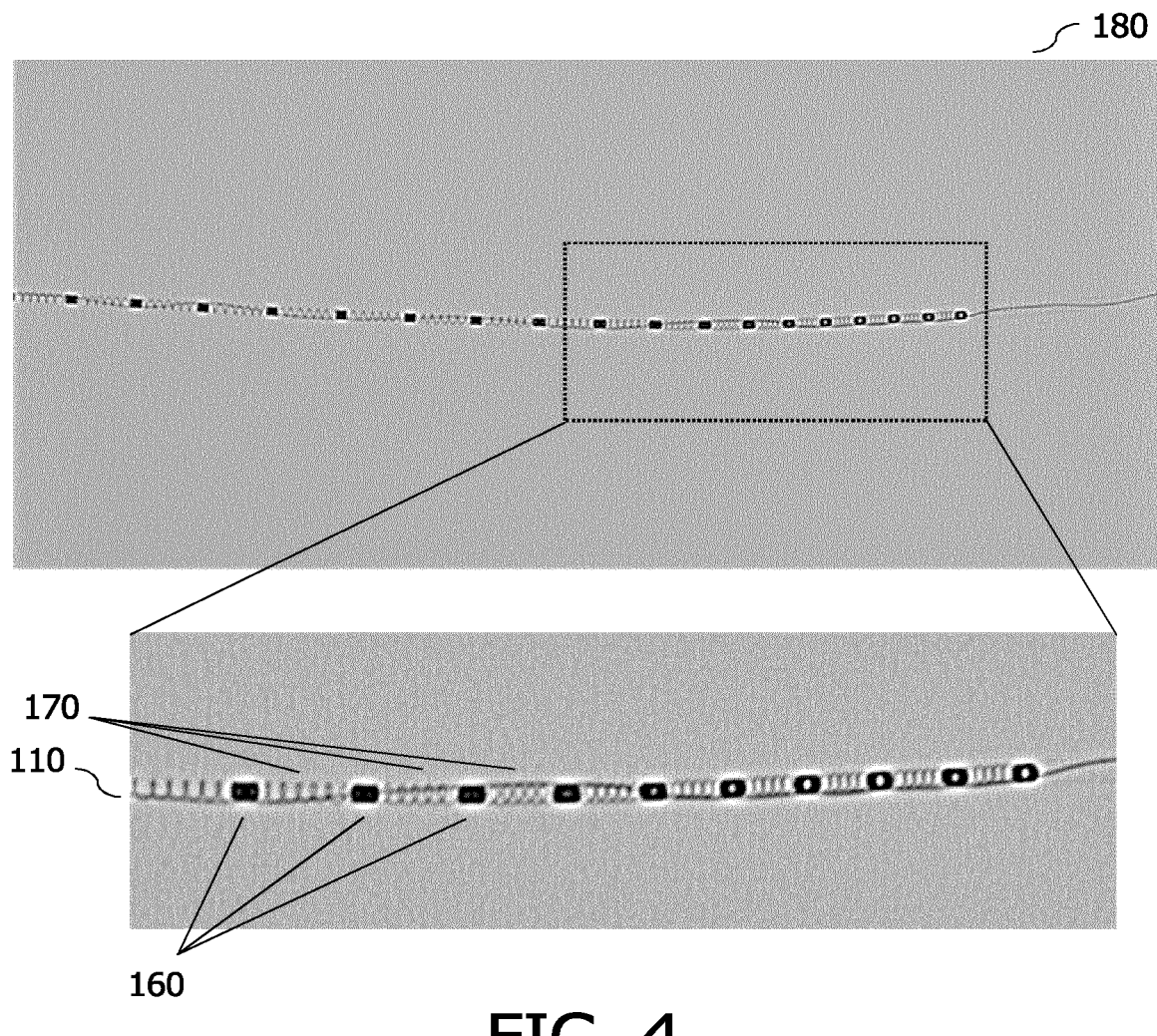
FIG. 4 illustrates an example X-ray image 180 of an elongate interventional device 110 including fiducial markers $160_{1 \ldots n}$.

FIG. 4 illustrates an example X-ray image 180 of an elongate interventional device 110 including fiducial markers $160_{1 \ldots n}$. The fiducial markers $160_{1 \ldots n}$ in FIG. 4 have a constant separation, although in other examples the separation may not be constant and instead vary in a known way, i.e. the separation between the fiducial markers may be predetermined. Towards the left side of FIG. 4, the segments 170 of the elongate interventional device 110 are reasonably parallel to the image plane 120 and the distance $190_{1 \ldots n-1}$ between the fiducial markers 160 is reasonably constant. Towards of the right side of FIG. 4, the segments 170 bend towards the image plane 120 and the distance $190_{1 \ldots n-1}$ between the fiducial markers 160 is relatively shorter.

The identifying operation S130 may include various graphical representations. In one example, a length of each segment 170 may be displayed. In another example each segment 170 may be rendered depending on the degree of out-of-plane deviation of the segment. Thus, with reference to FIG. 4, segments 170 towards the right side of the illustration having an out-of-plane deviation respective the image plane 120 may be rendered in a different manner to segments 170 towards the left side of the illustration that are substantially parallel to the image plane 120. In one example, a color scheme or a shading scheme may for example be applied to each segment depending on the degree of out-of-plane deviation of the segment. In some examples the rendering for each segment may depend on the rate of change of the length of consecutive segments along a length of the elongate interventional device. In another example, the identifying operation S130 may include:

determining S210 a rate of change of a length of consecutive segments $170_{1 \ldots n-1}$ along the elongate interventional device 110 in the one or more X-ray images 180; and generating S220 a graphical representation 350 of the rate of change of the length.

Figures 5A, 5B:
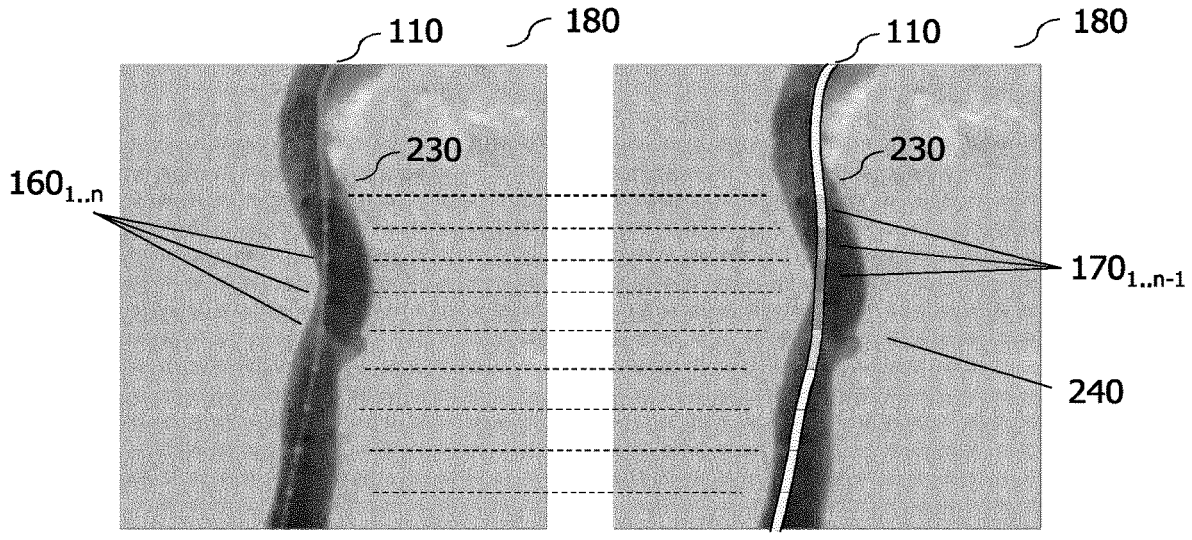
FIG. 5A illustrates an example X-ray image 180 of an elongate interventional device 110 including fiducial markers $160_{1 \ldots n}$ within a body lumen 230.
FIG. 5B illustrates X-ray image 180 of an elongate interventional device 110 including fiducial markers $160_{1 \ldots n}$ within a body lumen 230 and includes an example graphical representation 240 of the out-of-plane deviation of segments $170_{1 \ldots n-1}$.
Figure 5C:
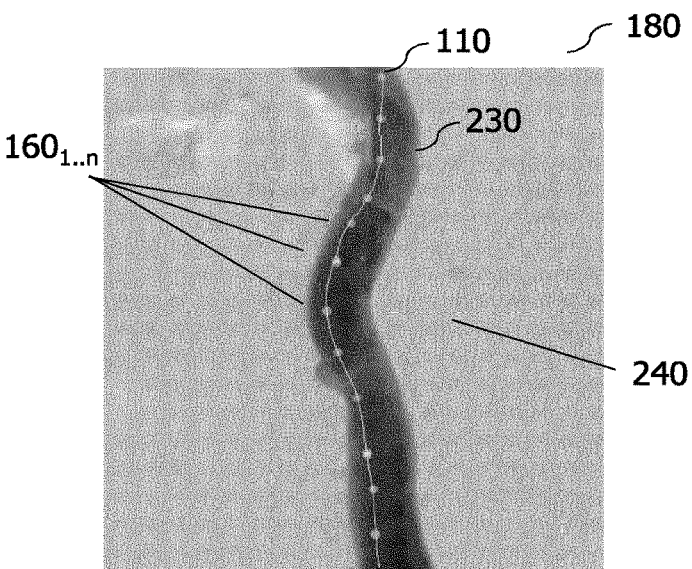
FIG. 5C illustrates an example X-ray image 180 of an elongate interventional device 110 including fiducial markers $160_{1 \ldots n}$ within a body lumen 230 and represents a lateral view with respect to FIG. 5A.

FIG. 5A illustrates an example X-ray image 180 of an elongate interventional device 110 including fiducial markers $160_{1 \ldots n}$ within a body lumen 230. FIG. 5B illustrates X-ray image 180 of an elongate interventional device 110 including fiducial markers $160_{1 \ldots n}$ within a body lumen 230 and includes an example graphical representation 240 of the out-of-plane deviation of segments $170_{1 \ldots n-1}$. FIG. 5C illustrates an example X-ray image 180 of an elongate interventional device 110 including fiducial markers $160_{1 \ldots n}$ within a body lumen 230 and represents a lateral view with respect to FIG. 5A. In the example of FIG. 5A and FIG. 5B, the body lumen 230, and thus the elongate interventional device 110, deviates out-of-plane with respect to the image plane 120. In particular, the deviation in FIG. 5A and FIG. 5B deviates away from the image plane 120 in the central section of the image and above this the body lumen 230 levels out to be more parallel to the image plane 120 in the upper section of the image. In lateral view, i.e., viewed from the left side of FIG. 5A in a horizontal direction, the elongate interventional device 110 would have an S-shaped profile, as shown in FIG. 5C. Consequent to the identifying operation S130, the central section of the elongate interventional device 110 in FIG. 5B is shaded with a darker shade, and with the darkest shade representing the segments with the highest the rate of change of the length of consecutive segments along the length of the elongate interventional device.

The method described above may include one or more additional operations, these being described with reference to FIG. 6, which is another flowchart of an example method of identifying an out-of-plane deviation of an elongate interventional device 110 in accordance with some aspects of the disclosure. The flowchart in FIG. 6 includes the operations S100, S110 and S120 that were described above, and additionally includes optional operations S140-S320 that have dashed outlines in FIG. 6. These additional optional operations are described with reference to further examples below.

Figure 6:
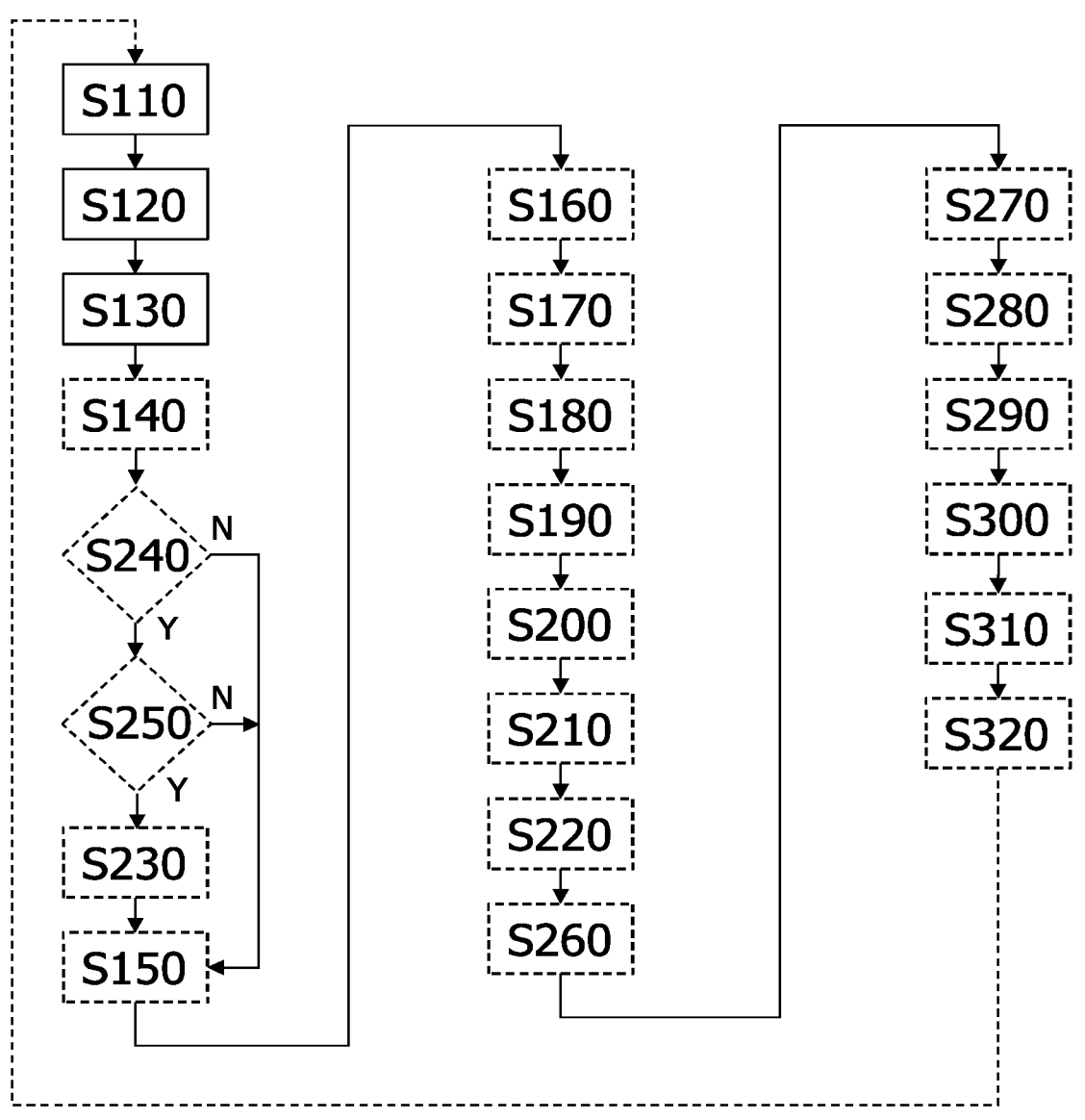
FIG. 6 is another flowchart of an example method of identifying an out-of-plane deviation of an elongate interventional device 110 in accordance with some aspects of the disclosure.

With reference to FIG. 6, and FIG. 1, in one example, a subsequent imaging pose 210 is computed. In this example, the X-ray imaging data is generated with the X-ray source-detector arrangement 130, 140, 150 having an initial imaging pose 200 respective the elongate interventional device 110. In this example, the operations include:

computing S140 a subsequent imaging pose 210 for the X-ray source-detector arrangement respective the elongate interventional device such that the distance $190_{1 \ldots n-1}$ between the one or more pairs of the fiducial markers $160_{1 \ldots n}$ increases for the one or more segments $170_{1 \ldots n}$ of the elongate interventional device 110 having an out-of-plane deviation.

As may be appreciated, if the pose of the X-ray source-detector arrangement is adjusted such that for the one or more segments $170_{1 \ldots n}$ of the elongate interventional device 110 having an out-of-plane deviation, the distance $190_{1 \ldots n-1}$ between the one or more pairs of the fiducial markers $160_{1 \ldots n}$ increases, the subsequent imaging pose 210 results in a curve that includes the out-of-plane deviating segments $170_{1 \ldots n}$ being aligned relatively more parallel to the image plane. Thus, the subsequent imaging pose results in an improved visualization of the out-of-plane deviating segments of the elongate interventional device.

By way of an example, applying the subsequent imaging pose 210 computed in operation S140 to the source-detector arrangement that was used to generate the image of FIG. 5A may include rotating the X-ray source detector arrangement by 90° around the vertical line in the plane of the X-ray image 180 such that the elongate interventional device 110 is viewed from the left side of FIG. 5A in a horizontal direction. This would result in a side-projection of the elongate interventional device 110, the side-projection having a more S-shaped profile wherein the distance between each pair of fiducial markers $160_{1 \ldots n}$ that currently have an out-of-plane deviation, increases. This side-projection image is shown in FIG. 5C.

Figure 7A:
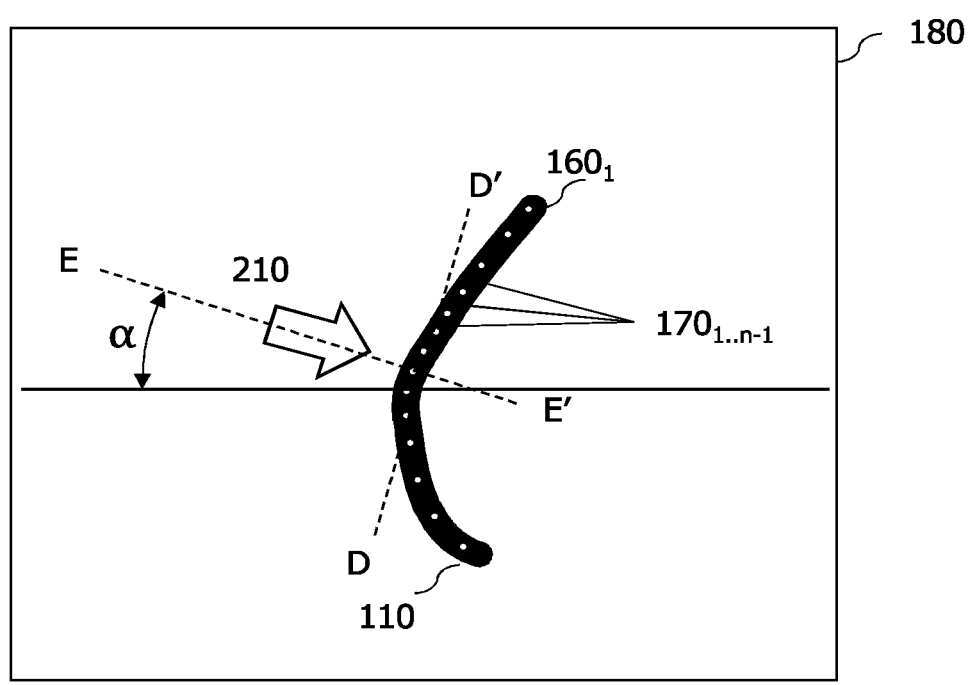
FIG. 7A is a schematic diagram of an example X-ray image 180 including an identification of a position of one or more segments $170_{1 \ldots n-1}$ of the elongate interventional device 110 having an out-of-plane deviation, and an example graphical representation of a subsequent imaging pose 210.
Figure 7B:
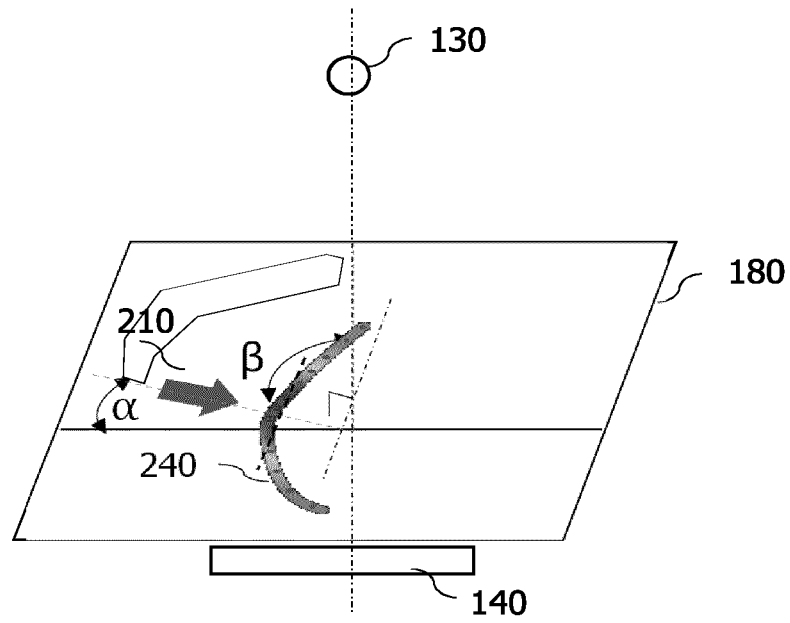
FIG. 7B is a schematic diagram of an example graphical representation 240 of a three-dimensional shape of an elongate interventional device 110 that is computed using a subsequent imaging pose 210.

In some examples the subsequent imaging pose 210 computed in the operation S140 comprises applying a predetermined pose transformation to the initial pose S200. For example, the subsequent imaging pose 210 computed in the operation S140 may comprise a rotation of the current pose by approximately 90° with respect to a vertical axis coincident with the isocentre of the X-ray source-detector arrangement. Other predetermined pose transformations may likewise be applied. An example predetermined pose transformation that includes a rotation of 90° with respect to a vertical axis coincident with the isocentre of the X-ray source-detector arrangement is illustrated in FIG. 7B as angle β. A further pose transformation may also be applied by, for example, further rotating the pose, from the pose achieved by the aforementioned 90° rotation, by an angle α around an axis passing between the center of the source and the center of detector, such that a horizontal image axis is perpendicular to a constructed line fitted to fiducial markers $160_{1 \ldots n}$ at opposing ends of one or more out-of-plane deviating segments. See for example the line D-D' in FIG. 7A that represents the constructed line, and the angle α that represents the further pose transformation. Angle α may be computed geometrically from the X-ray image 180. With reference to FIG. 5B and FIG. 7A, the initial imaging pose 200 used to generate the X-ray image 180 is directed into the plane of the drawing. A subsequent imaging pose 210 that is achieved by rotating the initial imaging pose 200 by approximately 90° with respect to a vertical axis coincident with the isocentre of the X-ray source-detector arrangement, i.e. the angle β in FIG. 7B, will result in a more complete S-shaped image of the interventional device 110 and an improved visualization of the out-of-plane deviating segments that are currently dark-shaded in FIG. 5B. A further pose transformation by the angle α creates a view that maximizes the distances between fiducial markers $160_{1 \ldots n}$ at opposing ends of one or more out-of-plane deviating segments, and further improves the visualization by making a plane that coincides with the "S" more parallel to the image plane 120.

In some examples, the operations include:
  generating S150 a graphical representation of the computed subsequent imaging pose 210.

FIG. 7A is a schematic diagram of an example X-ray image 180 including an identification of a position of one or more segments $170_{1 \ldots n-1}$ of the elongate interventional device 110 having an out-of-plane deviation, and an example graphical representation of a subsequent imaging pose 210. The initial imaging pose (not illustrated is directed into the plane of the drawing of FIG. 7A. The graphical representation of a computed subsequent imaging pose 210 is provided by an arrow in FIG. 7A, although alternative forms of graphical representation may also be used. The graphical representation may for example be in the form of an icon, or by means of text, such as "Rotate C-arm by 45 degrees about axis A-A'", and so forth. An identification of a position of one or more segments $170_{1 \ldots n-1}$ of the elongate interventional device 110 having an out-of-plane deviation, is provided in FIG. 7A by way of the dark-shaded segments in the central portion of the elongate interventional device 110 that deviate significantly away from the image plane. The example illustrated in FIG. 7A shows a recommended subsequent imaging pose 210 that is achieved by rotated the initial imaging pose by angle α.

In some examples the pose adjustment between the initial imaging pose 200 and the subsequent imaging pose 210 is made by a user, and in other examples the pose adjustment is made automatically. When the pose adjustment is made automatically, the operations may include:
  generating S230 control signals for automatically adjusting a pose of the X-ray source-detector arrangement 130, 140, 150 from the initial imaging pose 200 to the subsequent imaging pose 210.

In some examples, the pose adjustment is made on the condition that the computed pose adjustment exceeds a predetermined threshold, and/or on the condition that user confirmation of the automatic adjustment is received. In these examples, the generating S230 control signals for automatically adjusting the pose of the X-ray source-detector arrangement 130, 140, 150 is performed:

i) contingent S240 a difference between the computed subsequent imaging pose 210 and the initial imaging pose 200 exceeding a predetermined threshold; and/or ii) contingent S250 user input confirming the automatically adjusting the pose of the X-ray source-detector arrangement 130, 140, 150.

In some examples, after the subsequent imaging pose 210 has been provided, the operations include estimating a three-dimensional shape of the elongate interventional device 110. In these examples, the operations include:

receiving S160 subsequent X-ray imaging data representing one or more subsequent X-ray images 220 of the elongate interventional device 110 including the plurality of fiducial markers $160_{1 \ldots n}$ with the X-ray source-detector arrangement 130, 140, 150 having the subsequent imaging pose 210 respective the elongate interventional device 110; and computing S170, based on the X-ray imaging data and the subsequent X-ray imaging data, an estimation of the three-dimensional shape of the elongate interventional device 110.

FIG. 7B is a schematic diagram of an example graphical representation 240 of a three-dimensional shape of an elongate interventional device 110 that is computed using a subsequent imaging pose 210. Various alternative graphical representations to the example of FIG. 7B may alternatively be used.

The estimation of the three-dimensional shape of the elongate interventional device 110 may be computed using various techniques. In one technique, a model of the elongate interventional device including the fiducial markers may be fitted to the X-ray imaging data and the subsequent X-ray imaging data. The fitted model may be constrained based on the mechanical properties of the elongate interventional device, such as its stiffness. The fitted model may be constrained based on X-ray image information that provides context to the location of the elongate interventional device. For example, the fitted model may be constrained based on a knowledge that the elongate interventional device is disposed in the aorta or the brain vasculature, or the lung airways, etc. In another example, a stereo image reconstruction technique such as those disclosed in a document by Brost, A. et al, entitled "Accuracy of x-ray image-based 3D localization from two C-arm views: a comparison between an ideal system and a real device", Proc. SPIE 7261, Medical Imaging 2009: Visualization, Image-Guided Procedures, and Modeling, 72611Z (13 Mar. 2009) may be applied to the X-ray imaging data and the subsequent X-ray imaging data. In yet another example, computing S170 an estimation of the three-dimensional shape of the elongate interventional device 110, includes:

generating S180 one or more subsequent X-ray images 220 from the subsequent X-ray imaging data;

segmenting S190 the one or more X-ray images 180 and the one or more subsequent X-ray images 220 to determine a position of each of the plurality of fiducial markers $160_{1 \ldots n}$ in the one or more X-ray images 180 and a position of each of the plurality of fiducial markers $160_{1 \ldots n}$ in the one or more subsequent X-ray images 220, respectively; and ordering S200 the plurality of fiducial markers based on the position of each of the plurality of fiducial markers $160_{1 \ldots n}$ in the one or more X-ray images 180, and based on the position of each of the plurality of fiducial markers $160_{1 \ldots n}$ in the one or more subsequent X-ray images 220, such that the order of the plurality of fiducial markers $160_{1 \ldots n}$ represents a three-dimensional shape of the elongate interventional device 110.

In this example, the segmenting operation S190 and/or the ordering operation S200 may be performed using a neural network. An example of this technique is described with reference to FIG. 8, which is a flowchart of an example method of computing S170 an estimation of a three-dimensional shape of an elongate interventional device 110.

Figure 8:
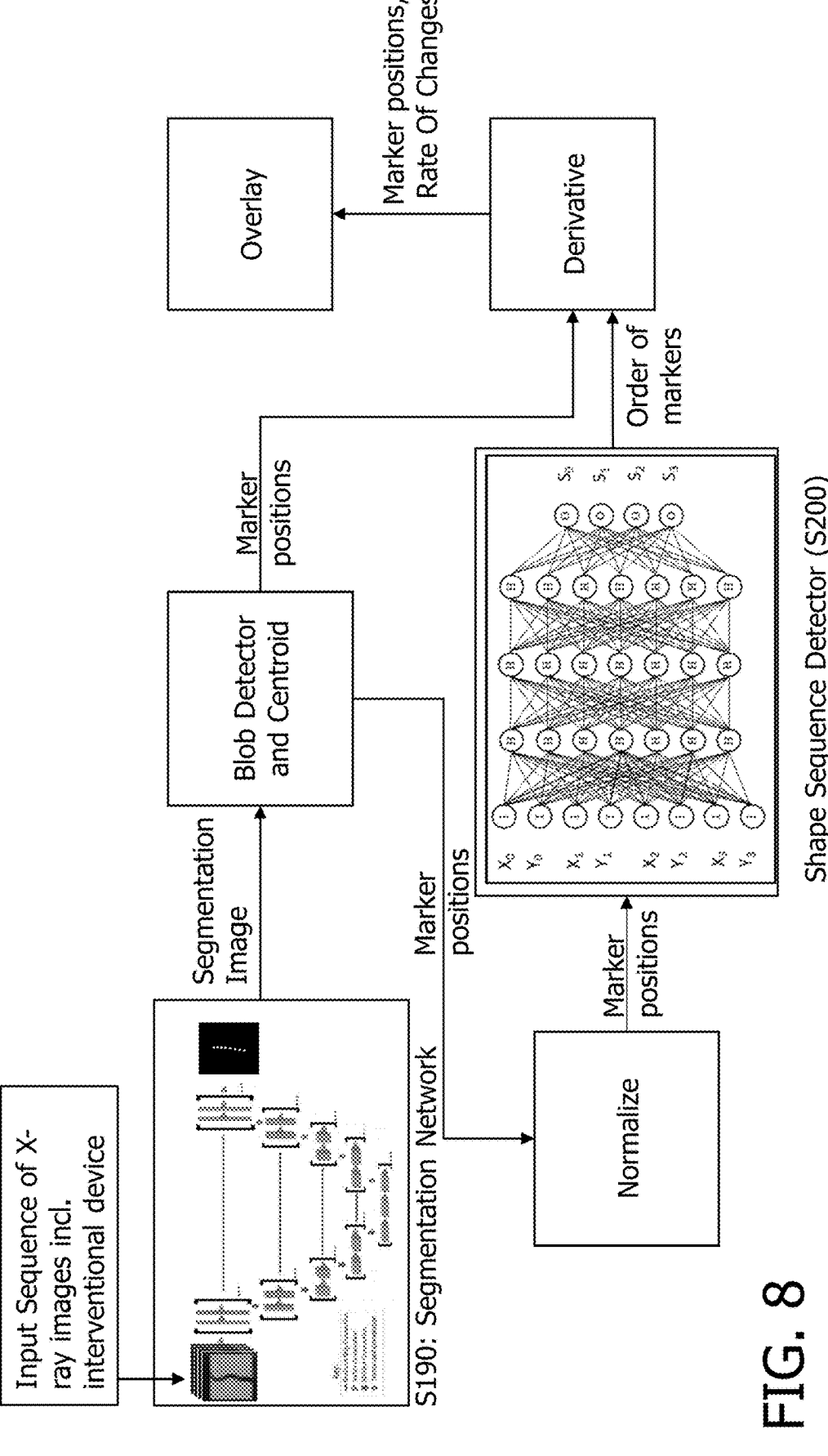
FIG. 8 is a flowchart of an example method of computing S170 an estimation of a three-dimensional shape of an elongate interventional device 110.

With reference to FIG. 8, having generated the X-ray image data and the subsequent X-ray image data, the flowchart starts by inputting the X-ray image data and the subsequent X-ray image data into a segmentation network. In operation S190, the block labelled "Segmentation network" segments the fiducial markers $160_{1 \ldots n}$ from the X-ray images using a deep learning method based on an encoder-decoder network. An example segmentation network for this purpose is disclosed in a document by Ronneberger, O., Fischer, P., Brox, T., 2015, entitled "U-Net: Convolutional Networks for Biomedical Image Segmentation", arXiv:150504597v1 1-8. The sequence of input X-ray images is stacked and may include temporal information to increase robustness of the segmentation. The segmentation network may be trained per elongate interventional device type, or may include an input to the network with an index indicating the elongate interventional device type represented in the X-ray images. The elongate interventional device type may also be determined automatically using an artificial intelligent image-based classifier. After an X-ray image has been segmented, the segmented image "Segmentation Image" is further processed in the block labelled "Blob detector and Centroid" which identifies overlaps between fiducial markers and calculated the center location of each fiducial marker, i.e. the centroid x,y pairs representing the "Marker positions".

The next step is to order the list of fiducial marker positions such that they probabilistically represent the elongate interventional device. This process may be more complex for curved elongate interventional devices than for straight elongate interventional devices due to the nature of projection X-ray images. For straight elongate interventional devices, techniques disclosed in a document by Ambrosini, P., et al. entitled "Fully automatic and real-time catheter segmentation in X-ray fluoroscopy", International Conference on Medical Image Computing and Computer-Assisted Intervention, Springer, Cham, 2017, may be used. However, for more complex curved elongate interventional devices the block labelled Shape Sequence Detector in FIG. 8 may be used.

Prior to inputting the fiducial marker positions into the Shape Sequence detector, the input fiducial Marker positions that are generated by the Blob Detector and Centroid may be normalized in the block labelled "Normalize" in order to decrease the complexity of ordering their positions. The normalization first translates the fiducial marker positions by computing their positions relative the centroid of all the fiducial markers, and then rotates the fiducial marker positions such that the principal axis of the set, e.g. based on principle component analysis, is aligned with a vertical axis.

Next, the block labelled Shape Sequence Detector formulates the problem of ordering the list of fiducial marker positions as a multi-label classification problem that uses fully convolutional deep learning model which encodes the natural variation in shape, and fiducial marker order, of the elongate interventional device in a variety of projections. The input is a vector of fiducial marker positions and the output is an ordered sequence of fiducial marker positions. The fiducial marker positions outputted by the shape sequence detector may for example be: X0, Y0→S0=0.4; X1, Y1→S1=0.1, X2, Y2→S2=0.7, which defines the order of the fiducial markers in the shape as S1, S0, S2. The number of hidden layers used in the neural network of the Shape Sequence Detector may depend on the available time, and its complexity may be higher for more flexible elongate interventional devices and the number of fiducial markers represented by the model. By way of an example, an elongate interventional device with twelve fiducial markers might have twelve outputs, and eight 8 hidden layers. In one example, a sigmoid activation function is used as the last layer in the neural network, and binary cross-entropy is used as the loss-function. Common hyperparameter tuning and training methods may be used, such as the Adam optimization algorithm.

The output of the Shape Sequence Detector includes the fiducial marker positions and their order. This data may be used to determine the distance $190_{1 \ldots n\text{-}1}$ between pairs of fiducial markers. The distance between consecutive fiducial markers is then be input to the block labelled Derivative, which determines the rate of change of the length of the segments of the elongate interventional device, for example using a discrete derivative function. In the block labelled "Overlay", this information may then be mapped to a color pallet, or mapped to a line thickness and so forth, in order to provide a graphical representation of the rate of change of the length of consecutive segments $170_{1 \ldots n\text{-}1}$ along the elongate interventional device 110 in the one or more X-ray images 180. The graphical representation may for example be provided as an overlay on the one or more X-ray images 180.

In use, a common trained neural network represented by block "Shape Sequence Detector" may be used, or a specific trained neural network may be selected, by a user, or automatically, based on the anatomical region in which the elongate interventional device is disposed, based on the type of interventional device being imaged, or based on the procedure being carried out with the elongate interventional device. The anatomical region in which the elongate interventional device is disposed may be determined based on X-ray image analysis, or based on X-ray imaging system settings. The elongate interventional device may for example be disposed in the aorta, or in the brain vasculature, or in the lung airways. The anatomical region may also be used to constrain the three-dimensional shape of the elongate interventional device during the ordering operation S200.

Figure 9:
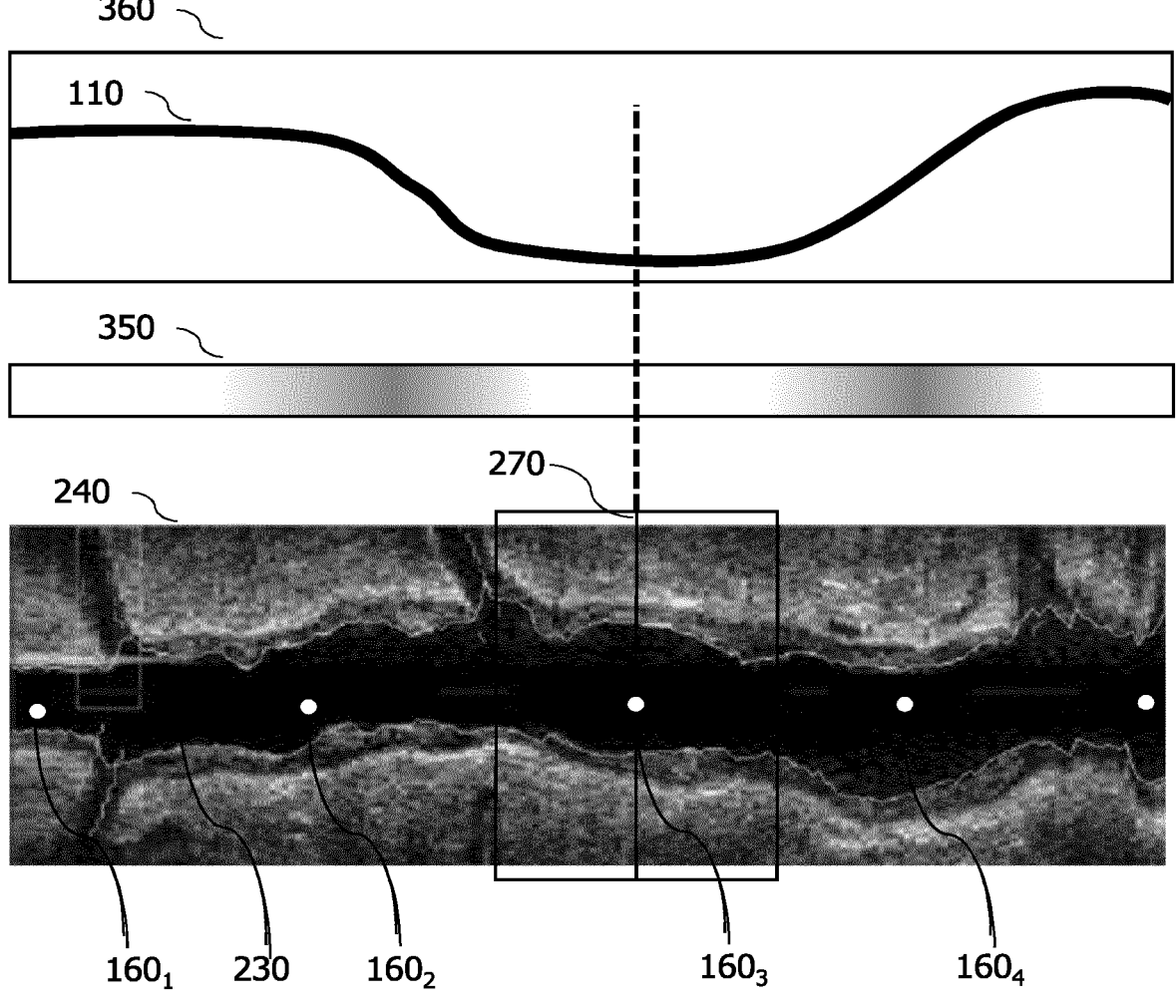
FIG. 9 is a schematic diagram including an example intravascular ultrasound image 240 and an example graphical representation 350 of the rate of change of the length of consecutive intravascular ultrasound imaging device segments 170.

In some examples, the elongate interventional device 110 includes an intravascular ultrasound imaging device. FIG. 9 is a schematic diagram including an example intravascular ultrasound image 240 and an example graphical representation 350 of the rate of change of the length of consecutive intravascular ultrasound imaging device segments 170. Image 360 represents a lateral view of the elongate interventional device 110 showing its out-of-plane deviation with respect to the image plane 120 and is provided for the purpose of explanation only. The intravascular ultrasound image 240 in FIG. 9 represents a longitudinal view of the ultrasound signal reflectance along a body lumen 230. A plurality of fiducial markers $160_{1 \ldots n}$ are disposed along a length of the IVUS imaging device in FIG. 9 and their positions, which are determined from an X-ray image that includes the IVUS imaging device, are overlaid onto the intravascular ultrasound image 240. The example graphical representation 350 of the rate of change of the length of consecutive intravascular ultrasound imaging device segments 170 in FIG. 9 includes two dark-rendered regions having a relatively high rate of change of length, and three white regions having a relatively low rate of change of length. With reference to FIG. 6 and FIG. 9, the rate of change of the length of consecutive intravascular ultrasound imaging device segments 170 is determined in operation S210 wherein a rate of change of a length of consecutive segments $170_{1 \ldots n\text{-}1}$ along the elongate interventional device 110 is determined in the one or more X-ray images 180. The graphical representation 350 of the rate of change of the length may then be generated in operation S220.

FIG. 9 also illustrates the correlation of an axial position 270 along the body lumen 230 in the intravascular ultrasound image 240 with a corresponding position along the body lumen 230 in the graphical representation 350 of the rate of change of the length of consecutive intravascular ultrasound imaging device segments 170. In FIG. 9 the correlation is provided by the dashed line linking the positions in the graphical representation 350 of the rate of change of the length of consecutive intravascular ultrasound imaging device segments 170, although other forms of providing this correlation may be used, including displaying the images 240 and 350 side by side, highlighting regions in both images, and so forth.

In one example, the axial position 270 along the body lumen 230 in the intravascular ultrasound image 240 is correlated with a corresponding position along the body lumen 230 in the graphical representation 250 of the three-dimensional shape of the elongate interventional device 110. This is described with reference to FIG. 10, which is a schematic diagram including an example intravascular ultrasound image 240 and an example composite X-ray image 260. In this example, the one or more X-ray images 180 represent a first longitudinal view of a body lumen 230, and the one or more subsequent X-ray images 220 represent a second longitudinal view of the body lumen, and the elongate interventional device 110 comprises an intravascular ultrasound imaging device. The method includes:

receiving S260 intravascular ultrasound imaging data representing ultrasound signal reflectance along the body lumen 230 within the first view and the second view;

generating S270, from the intravascular ultrasound imaging data, an intravascular ultrasound image 240 representing the ultrasound signal reflectance along the body lumen 230;

generating S280, based on the computed estimation of the three-dimensional shape of the elongate interventional device, a graphical representation 240 of the three-dimensional shape of the elongate interventional device 110; and correlating S290 an axial position 270 along the body lumen 230 in the intravascular ultrasound image 240 with a corresponding position along the body lumen 230 in the graphical representation 250 of the three-dimensional shape of the elongate interventional device 110.

Figure 10:
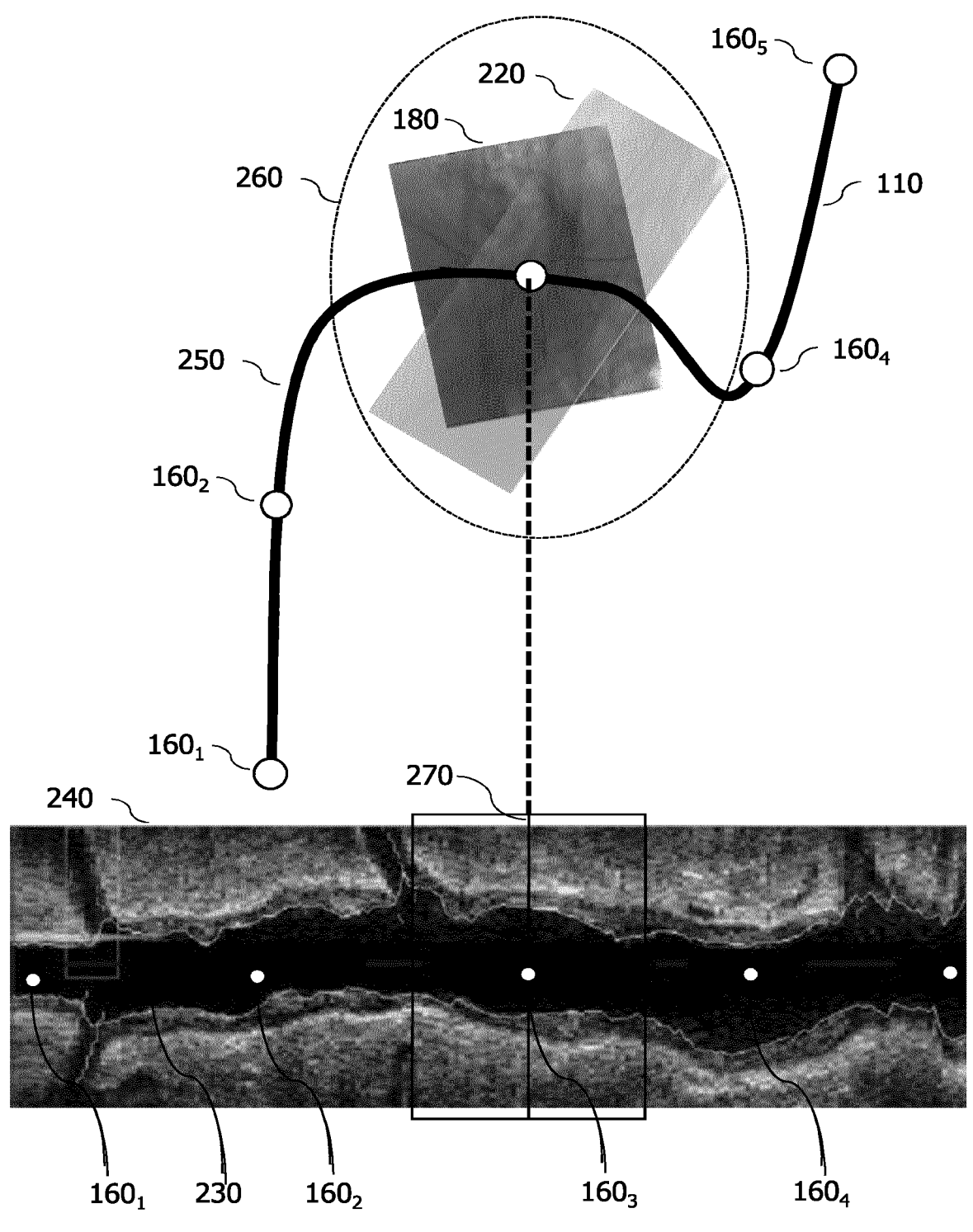
FIG. 10 is a schematic diagram including an example intravascular ultrasound image 240 and an example composite X-ray image 260.

With reference to FIG. 10, in one example, the correlation in operation S290 is provided by an indicator in the form of a dashed vertical line connecting the intravascular ultrasound image 240 with the graphical representation 250 of the three-dimensional shape of the elongate interventional device 110. In another example, the correlation in operation S290 may be provided by overlaying the three-dimensional shape of the elongate interventional device 110 onto the intravascular ultrasound image 240. In these examples, a composite X-ray image may be generated from the X-ray imaging data and the subsequent X-ray imaging data, and an axial position 270 along the body lumen 230 in the intravascular ultrasound image 240 may be correlated with a position in the composite X-ray image 260. In this example, the method includes:

generating S300, based on the X-ray imaging data and the subsequent X-ray imaging data, a composite X-ray image 260 including a portion of the first longitudinal view 180 of the body lumen 230 and a portion of the second longitudinal view 220 of the body lumen 230; and correlating S310 an axial position 270 along the body lumen 230 in the intravascular ultrasound image 240 with a position in the composite X-ray image 260.

The composite X-ray image in FIG. 10 may be generated by overlaying corresponding portions of the X-ray image and the subsequent X-ray image, and facilitates a deeper insight into the anatomical region under investigation. In one example, the portion of the first longitudinal view 180 of the body lumen 230 and the portion of the second longitudinal view 220 of the body lumen 230 may be centered on the indicator, i.e. the dashed line. The composite image 260 facilitates a confirmation of features in the intravascular image. For example, the composite image may be used to confirm the presence of potential vascular branches in the intravascular ultrasound image 240.

In one example, the elongate interventional device 110 comprises an intravascular ultrasound imaging device, and various control signals are generated for controlling a pose of the X-ray source-detector arrangement, or a collimation of the X-ray source-detector arrangement, or a patient bed, or a pullback device, when an imaging portion 280 of the intravascular ultrasound imaging device reaches the identified position of one or more segments $170_1 \ldots _{n-1}$ of the elongate interventional device 110 having an out-of-plane deviation. In this example, the method includes:

receiving S320 intravascular ultrasound imaging data representing ultrasound signal reflectance along the body lumen 230 whilst the intravascular ultrasound imaging device is moved axially along the body lumen 230; and i) the generating S230 control signals for automatically adjusting a pose of the X-ray source-detector arrangement 130, 140, 150 from the initial imaging pose 200 to the subsequent imaging pose 210, is performed when an imaging portion 280 of the intravascular ultrasound imaging device reaches the identified position of one or more segments $170_1 \ldots _{n-1}$ of the elongate interventional device 110 having an out-of-plane deviation; and/or ii) comprising generating control signals for adjusting a collimation of the X-ray source-detector arrangement 130, 140, 150 when the imaging portion 280 of the intravascular ultrasound imaging device 110 reaches the identified position of one or more segments $170_1 \ldots _{n-1}$ of the elongate interventional device 110 having an out-of-plane deviation; and/or iii) comprising generating control signals for adjusting a patient bed 290 position when the imaging portion 280 of the intravascular ultrasound imaging device reaches 110 the identified position of one or more segments $170_1 \ldots _{n-1}$ of the elongate interventional device 110 having an out-of-plane deviation; and/or iv) wherein the intravascular ultrasound imaging device 110 is moved axially along the body lumen 230 by an automated pullback device, and comprising generating control signals for causing the automated pullback device to pause the axial movement of the intravascular ultrasound imaging device 110 along the body lumen 230 when the imaging portion 280 of the intravascular ultrasound imaging device 110 reaches the identified position of one or more segments $170_1 \ldots _{n-1}$ of the elongate interventional device 110 having an out-of-plane deviation.

The provision of the above-mentioned control signals improves the X-ray images that are generated, and/or improves workflow by avoiding that a user needs to perform such adjustments manually.

In one example, the one or more X-ray images 180 include a stream of X-ray image frames, and wherein operation of identifying S130 in the one or more X-ray images 180 a position of one or more segments $170_1 \ldots _{n-1}$ of the elongate interventional device 110 having an out-of-plane deviation respective the image plane 120, is based on a change in distance $190_1 \ldots _{n-1}$ between the one or more pairs of the fiducial markers $160_1 \ldots _n$ between consecutive image frames as the elongate interventional device 110 is moved axially along a body lumen 230.

In so doing, this example provides a dynamic indication of the out-of-plane deviation of the elongate interventional device.

In accordance with another example, a computer program product is provided. The computer program product includes instructions which when executed by a processor 300, cause the processor 300 to carry out a method of identifying an out-of-plane deviation of an elongate interventional device 110 respective an image plane 120 defined by X-ray images 180, 220 generated by an X-ray source-detector arrangement 130, 140, 150, the elongate interventional device 110 comprising a plurality of fiducial markers $160_1 \ldots _n$ distributed along a length of the elongate interventional device 110 to define segments $170_1 \ldots _{n-1}$ of the elongate interventional device 110, the method comprising:

receiving S110 X-ray imaging data representing one or more X-ray images 180 of the elongate interventional device 110 including the plurality of fiducial markers $160_1 \ldots _n$;

generating S120 one or more X-ray images 180 from the X-ray imaging data; and identifying S130 in the one or more X-ray images 180, and based on a distance $190_1 \ldots _{n-1}$ between one or more pairs of the fiducial markers $160_1 \ldots _n$ detected in the one or more X-ray images 180, a position of one or more segments $170_1 \ldots _{n-1}$ of the elongate interventional device 110 having an out-of-plane deviation respective the image plane 120.

The computer program product may include further instructions to perform one or more of the operations described above in relation to the computer-implemented method.

In accordance with another example, a non-transitory computer-readable storage medium is provided. The non-transitory computer-readable storage medium is encoded with instructions executable by one or more processors 300 for identifying an out-of-plane deviation of an elongate interventional device 110 respective an image plane 120 defined by X-ray images 180, 220 generated by an X-ray source-detector arrangement 130, 140, 150, the elongate interventional device 110 comprising a plurality of fiducial markers $160_1 \ldots _n$ distributed along a length of the elongate interventional device 110 to define segments $170_1 \ldots _{n-1}$ of the elongate interventional device 110; the computer-readable storage medium comprising instructions to:

receive S110 X-ray imaging data representing one or more X-ray images 180 of the elongate interventional device 110 including the plurality of fiducial markers $160_{1 \ldots n}$;

generate S120 one or more X-ray images 180 from the X-ray imaging data; and identify S130 in the one or more X-ray images 180, and based on a distance $190_{1 \ldots n-1}$ between one or more pairs of the fiducial markers $160_{1 \ldots n}$ detected in the one or more X-ray images 180, a position of one or more segments $170_{1 \ldots n-1}$ of the elongate interventional device 110 having an out-of-plane deviation respective the image plane 120.

The non-transitory computer-readable storage medium may include further instructions to perform one or more of the operations described above in relation to the computer-implemented method.

In another example, a system is provided. The system is configured to carry out one or more of the operations described in relation to the computer-implemented method. An example of the system 100 is illustrated in FIG. 1. In this example, a system 100 for identifying an out-of-plane deviation of an elongate interventional device 110 respective an image plane 120 defined by X-ray images 180, 220 generated by an X-ray source-detector arrangement 130, 140, 150, the elongate interventional device 110 comprising a plurality of fiducial markers $160_{1 \ldots n}$ distributed along a length of the elongate interventional device 110 to define segments $170_{1 \ldots n-1}$ of the elongate interventional device 110, is disclosed. The system 100 comprises a processor 300 configured to perform a method comprising:

receiving S110 X-ray imaging data representing one or more X-ray images 180 of the elongate interventional device 110 including the plurality of fiducial markers $160_{1 \ldots n}$;

generating S120 one or more X-ray images 180 from the X-ray imaging data; and identifying S130 in the one or more X-ray images 180, and based on a distance $190_{1 \ldots n-1}$ between one or more pairs of the fiducial markers $160_{1 \ldots n}$ detected in the one or more X-ray images 180, a position of one or more segments $170_{1 \ldots n-1}$ of the elongate interventional device 110 having an out-of-plane deviation respective the image plane 120.

The system 100 may be further configured to perform one or more of the operations described above in relation to the computer-implemented method.

In another example, an elongate interventional device 110 is provided for use with the system 100. The elongate interventional device 110 is described with reference to FIG. 11, which is a schematic diagram of an example intravascular ultrasound imaging device 110 including an imaging portion 280, and FIG. 12, which is a schematic diagram of an example elongate interventional device 110 including fiducial markers $160_{1 \ldots n}$ that include a cylindrical section. In FIG. 12, the images A-D represent A) reference with 0° rotation around axis 340 and 0° tilt, B) 90° rotation around axis 340 and 45° tilt C) 90° rotation around axis 340 and 0° tilt D) 45° rotation around axis 340 and 0° tilt.

Figure 11:
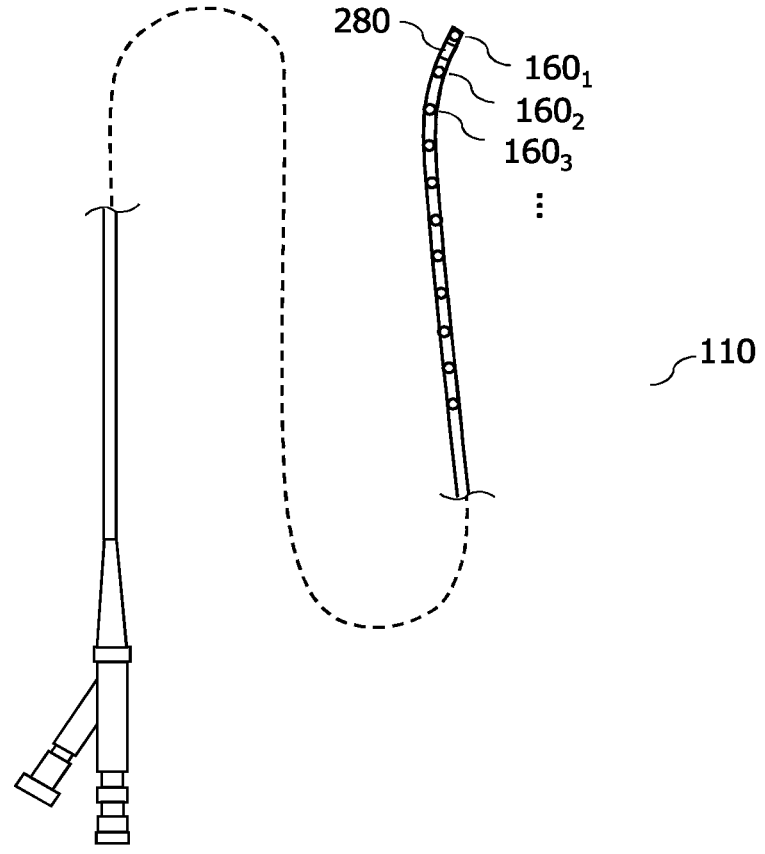
FIG. 11 is a schematic diagram of an example intravascular ultrasound imaging device 110 including an imaging portion 280.
Figure 12A:
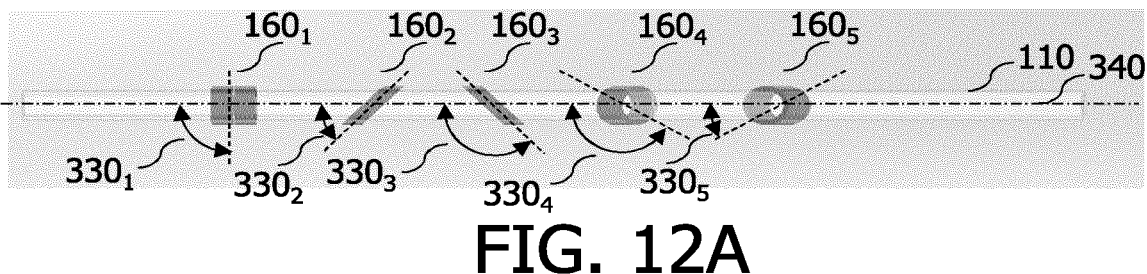
FIG. 12 is a schematic diagram of an example elongate interventional device 110 including fiducial markers $160_{1 \ldots n}$ that include a cylindrical section.
Figure 12B:
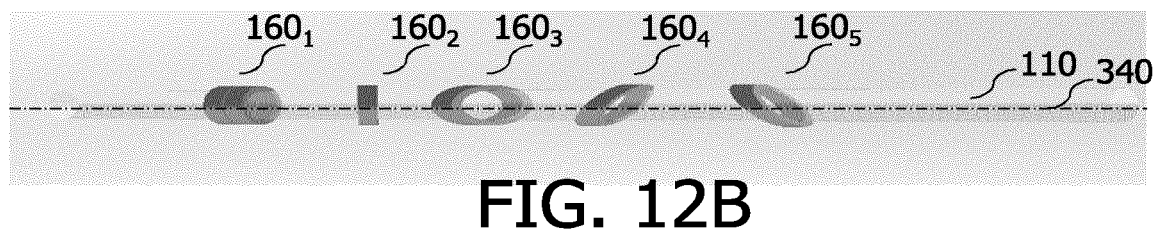
Figure 12C:
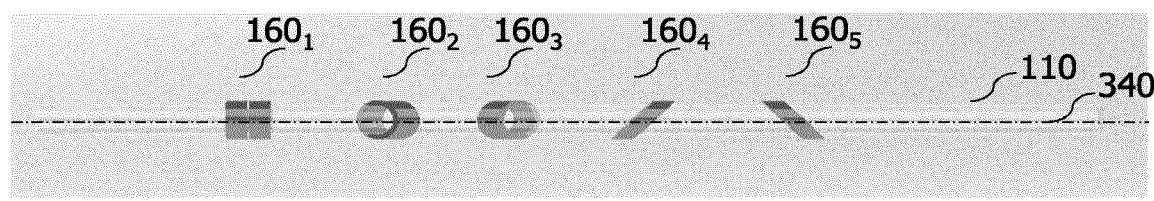
Figure 12D:
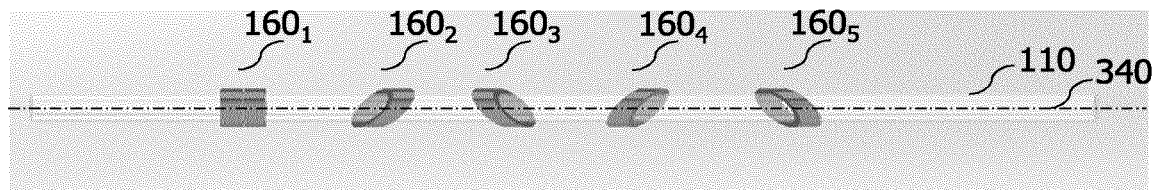

With reference to FIG. 11 and FIG. 12, an example elongate interventional device 110 includes a plurality of fiducial markers $160_{1 \ldots n}$ disposed axially along a length of the elongate interventional device 110; and i) each fiducial marker $160_{1 \ldots n}$ comprises a cylindrical section of X-ray absorbing material, each cylindrical section defining a plane having a different orientation $330_{1 \ldots n}$ with respect to an axis 340 of the elongate interventional device 110.

In an alternative example:

ii) each fiducial marker comprises a plurality of axially-separated regions of X-ray absorbing material, each region having a different axial length.

The plurality of fiducial markers may for example include i) one or more turns of X-ray absorbing wire wrapped around an axis of the elongate interventional device 110, and/or ii) five fiducial markers $160_{1 \ldots n}$ separated along the axis of the elongate interventional device 110 and/or iii) a ring comprising an X-ray absorbing material, and/or iv) a polymer doped with an X-ray absorbing material. Various X-ray absorbing materials may be used such as for example: gold, platinum, tungsten, titanium, barium, bismuth, iridium or tantalum.

The provision of fiducial markers that have different orientations with respect to the axis of the elongate interventional device, or different axial lengths, facilitates their distinction in the X-ray images 180, 220. Knowledge of their positions in the X-ray images may be used to facilitate their segmentation in operation S190, and thus to improve the determination of the position and/or orientation of the elongate interventional device 110. For example, the example of FIG. 12 may be used to determine a rotation of the elongate interventional device 110.

In another example, another computer-implemented method of identifying an out-of-plane deviation of a path of an elongate interventional device 110 respective an image plane 120 defined by a stream of X-ray image frames $400_{1 \ldots k}$ generated by an X-ray source-detector arrangement 130, 140, 150, the elongate interventional device 110 comprising one or more fiducial markers $160_{1 \ldots n}$ disposed along the elongate interventional device 110, is disclosed. The method comprises:

receiving X-ray imaging data representing a stream of X-ray image frames including the elongate interventional device 110 and the one or more fiducial markers $160_{1 \ldots n}$ as the elongate interventional device 110 moves along a path through a body lumen 230;

generating a plurality of X-ray image frames $400_{1 \ldots k}$ from the X-ray imaging data;

determining from the plurality of X-ray image frames $400_{1 \ldots k}$, and based on a distance moved $410_{1 \ldots k}$ by the one or more fiducial markers $160_{1 \ldots n}$ between consecutive X-ray image frames $400_{1 \ldots k}$, one or more sections of the path through the body lumen 230 having an out-of-plane deviation respective the image plane 120; and identifying, in subsequently generated X-ray image frames $400_{1 \ldots k}$, a position of the one or more sections of the path through the body lumen 230 having the out-of-plane deviation respective the image plane 120.

Figure 13:
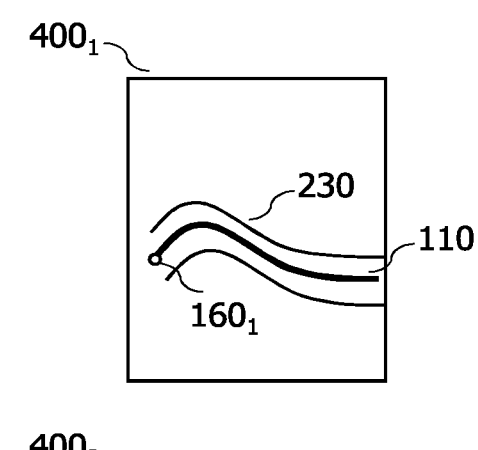
FIG. 13 is a schematic diagram of an example stream of X-ray image frames $400_{1 \ldots k}$ and illustrates a distance moved $410_{1 \ldots k}$ by a fiducial marker $160_1$ between consecutive X-ray image frames $400_{1 \ldots k}$.
Figure 13:
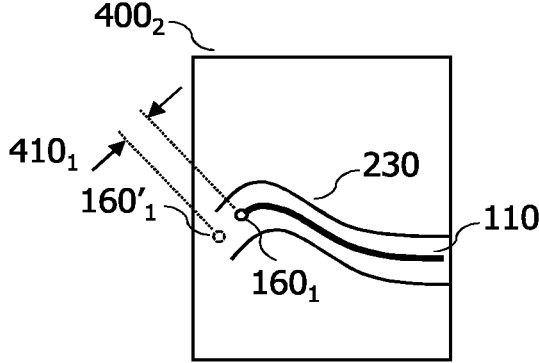
Figure 13:
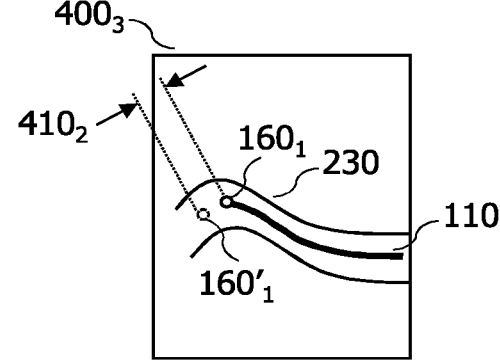
Figure 13:
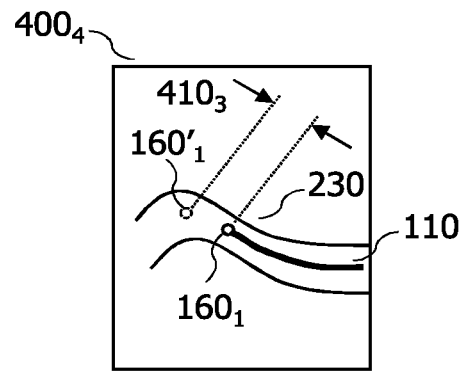

This example is described with reference to FIG. 13, which is a schematic diagram of an example stream of X-ray image frames $400_{1 \ldots k}$ and illustrates a distance moved $410_{1 \ldots k}$ by a fiducial marker $160_1$ between consecutive X-ray image frames $400_{1 \ldots k}$. In FIG. 13, the position of the fiducial marker $160_1$ in the previous X-ray image frame, is identified in a current X-ray image frame with the dashed fiducial marker $160'_1$. This example may be implemented using a system similar to the system 100 illustrated in FIG. 1, and wherein the processor 300 is instead configured to perform the above method steps. The operations described in relation to FIG. 6 may also be implemented with this example. In another example, a computer program product that includes instructions which when executed by a processor, cause the processor to carry out the method, is provided.

The above examples are to be understood as illustrative examples of the present disclosure. Further examples are also envisaged. For example, the examples described in relation to the computer implemented method may also be implemented in the computer program product, in the computer-readable storage medium, and in the system 100. It is therefore to be understood that a feature described in relation to any one example may be used alone, or in combination with other features described, and may also be used in combination with one or more features of another of the examples, or a combination of other the examples. Furthermore, equivalents and modifications not described above may also be employed without departing from the scope of the disclosure, which is defined in the accompanying claims. Any reference signs in the claims should not be construed as limiting the scope of the disclosure.

The invention claimed is:

1. A computer-implemented method of identifying an out-of-plane deviation of an elongate interventional device respective an image plane defined by X-ray images generated by an X-ray source-detector arrangement, having an initial imaging pose respective the elongate interventional device, the elongate interventional device comprising a plurality of fiducial markers distributed along a length of the elongate interventional device to define segments of the elongate interventional device, the method comprising:

receiving X-ray imaging data representing one or more X-ray images of the elongate interventional device including the plurality of fiducial markers;

generating one or more X-ray images from the X-ray imaging data;

identifying in the one or more X-ray images, and based on a distance between one or more pairs of the fiducial markers detected in the one or more X-ray images, a position of one or more segments of the elongate interventional device having an out-of-plane deviation respective the image plane; and computing a subsequent imaging pose for the X-ray source-detector arrangement respective the elongate interventional device such that the distance between the one or more pairs of the fiducial markers increases for the one or more segments of the elongate interventional device having an out-of-plane deviation.

2. The computer-implemented method according to claim 1, comprising:

generating a graphical representation of the computed subsequent imaging pose.

3. The computer-implemented method according to claim 1, comprising:

receiving subsequent X-ray imaging data representing one or more subsequent X-ray images of the elongate interventional device including the plurality of fiducial markers with the X-ray source-detector arrangement having the subsequent imaging pose respective the elongate interventional device; and computing, based on the X-ray imaging data and the subsequent X-ray imaging data, an estimation of the three-dimensional shape of the elongate interventional device.

4. The computer-implemented method according to claim 3, wherein the computing an estimation of the three-dimensional shape of the elongate interventional device, comprises:

generating one or more subsequent X-ray images from the subsequent X-ray imaging data;

segmenting the one or more X-ray images and the one or more subsequent X-ray images to determine a position of each of the plurality of fiducial markers in the one or more X-ray images and a position of each of the plurality of fiducial markers in the one or more subsequent X-ray images, respectively; and ordering the plurality of fiducial markers based on the position of each of the plurality of fiducial markers in the one or more X-ray images, and based on the position of each of the plurality of fiducial markers in the one or more subsequent X-ray images, such that the order of the plurality of fiducial markers represents a three-dimensional shape of the elongate interventional device.

5. The computer-implemented method according to claim 1 comprising:

determining a rate of change of a length of consecutive segments along the elongate interventional device in the one or more X-ray images; and generating a graphical representation of the rate of change of the length.

6. The computer-implemented method according to claim 1, comprising:

generating control signals for automatically adjusting a pose of the X-ray source-detector arrangement from the initial imaging pose to the subsequent imaging pose.

7. The computer-implemented method according to claim 6, wherein the generating control signals for automatically adjusting the pose of the X-ray source-detector arrangement is performed at least one of:

i) contingent a difference between the computed subsequent imaging pose (210) and the initial imaging pose exceeding a predetermined threshold; and ii) contingent user input confirming the automatically adjusting the pose of the X-ray source-detector arrangement.

8. The computer-implemented method according to claim 3, wherein the one or more X-ray images represent a first longitudinal view of a body lumen, wherein the one or more subsequent X-ray images represent a second longitudinal view of the body lumen, and wherein the elongate interventional device comprises an intravascular ultrasound imaging device, and comprising:

receiving intravascular ultrasound imaging data representing ultrasound signal reflectance along the body lumen within the first view and the second view;

generating, from the intravascular ultrasound imaging data, an intravascular ultrasound image representing the ultrasound signal reflectance along the body lumen;

generating, based on the computed estimation of the three-dimensional shape of the elongate interventional device, a graphical representation of the three-dimensional shape of the elongate interventional device; and correlating an axial position along the body lumen in the intravascular ultrasound image with a corresponding position along the body lumen in the graphical representation of the three-dimensional shape of the elongate interventional device.

9. The computer-implemented method according to claim 8, comprising:

generating, based on the X-ray imaging data and the subsequent X-ray imaging data, a composite X-ray image including a portion of the first longitudinal view of the body lumen and a portion of the second longitudinal view of the body lumen; and correlating an axial position along the body lumen in the intravascular ultrasound image with a position in the composite X-ray image.

10. The computer-implemented method according to claim 6, wherein the elongate interventional device comprises an intravascular ultrasound imaging device, and comprising:

receiving intravascular ultrasound imaging data representing ultrasound signal reflectance along the body lumen whilst the intravascular ultrasound imaging device is moved axially along the body lumen; and wherein at least one of:

i) the generating control signals for automatically adjusting a pose of the X-ray source-detector arrangement from the initial imaging pose to the subsequent imaging pose, is performed when an imaging portion of the intravascular ultrasound imaging device reaches the identified position of one or more segments of the elongate interventional device having an out-of-plane deviation;

ii) comprising generating control signals for adjusting a collimation of the X-ray source-detector arrangement when the imaging portion of the intravascular ultrasound imaging device reaches the identified position of one or more segments of the elongate interventional device having an out-of-plane deviation;

iii) comprising generating control signals for adjusting a patient bed position when the imaging portion of the intravascular ultrasound imaging device reaches the identified position of one or more segments of the elongate interventional device 0) having an out-of-plane deviation; and iv) wherein the intravascular ultrasound imaging device is moved axially along the body lumen by an automated pullback device, and comprising generating control signals for causing the automated pullback device to pause the axial movement of the intravascular ultrasound imaging device along the body lumen when the imaging portion of the intravascular ultrasound imaging device reaches the identified position of one or more segments of the elongate interventional device having an out-of-plane deviation.

11. The computer-implemented method according to claim 1, wherein the one or more X-ray images comprises a stream of X-ray image frames, and wherein the identifying in the one or more X-ray images a position of one or more segments of the elongate interventional device having an out-of-plane deviation respective the image plane, is based on a change in distance between the one or more pairs of the fiducial markers between consecutive image frames as the elongate interventional device is moved axially along a body lumen.

12. A non-transitory computer-readable medium comprising instructions which, when executed by a processor, cause the processor to:

identify an out-of-plane deviation of an elongate interventional device respective an image plane defined by X-ray images generated by an X-ray source-detector arrangement, having an initial imaging pose respective the elongate interventional device, the elongate interventional device comprising a plurality of fiducial markers distributed along a length of the elongate interventional device to define segments of the elongate interventional device, including:

receiving X-ray imaging data representing one or more X-ray images of the elongate interventional device including the plurality of fiducial markers;

generating one or more X-ray images from the X-ray imaging data;

identifying in the one or more X-ray images, and based on a distance between one or more pairs of the fiducial markers detected in the one or more X-ray images, a position of one or more segments of the elongate interventional device having an out-of-plane deviation respective the image plane; and compute a subsequent imaging pose for the X-ray source-detector arrangement respective the elongate interventional device such that the distance between the one or more pairs of the fiducial markers increases for the one or more segments of the elongate interventional device having an out-of-plane deviation.

13. A system for identifying an out-of-plane deviation of an elongate interventional device) respective an image plane defined by X-ray images generated by an X-ray source-detector arrangement, having an initial imaging pose respective the elongate interventional device, the elongate interventional device comprising a plurality of fiducial markers distributed along a length of the elongate interventional device to define segments of the elongate interventional device, the system comprising:

a processor configured to:

receive X-ray imaging data representing one or more X-ray images of the elongate interventional device including the plurality of fiducial markers;

generate one or more X-ray images from the X-ray imaging data;

identify in the one or more X-ray images, and based on a distance between one or more pairs of the fiducial markers detected in the one or more X-ray images, a position of one or more segments of the elongate interventional device having an out-of-plane deviation respective the image plane; and compute a subsequent imaging pose for the X-ray source-detector arrangement respective the elongate interventional device such that the distance between the one or more pairs of the fiducial markers increases for the one or more segments of the elongate interventional device having an out-of-plane deviation.

14. The system of claim 13, further comprising an elongate interventional device comprising a plurality of fiducial markers disposed axially along a length of the interventional device; wherein:

i) each fiducial marker comprises a cylindrical section of X-ray absorbing material, each cylindrical section defining a plane having a different orientation with respect to an axis of the interventional device; or ii) each fiducial marker comprises a plurality of axially-separated regions of X-ray absorbing material, each region having a different axial length.

\* \* \* \* \*